Feb. 9, 1926.
M. C. JONES
POETIC PUZZLE AND POETIC PUZZLE BLOCKS
Original Filed Nov. 9, 1922
1,572,433
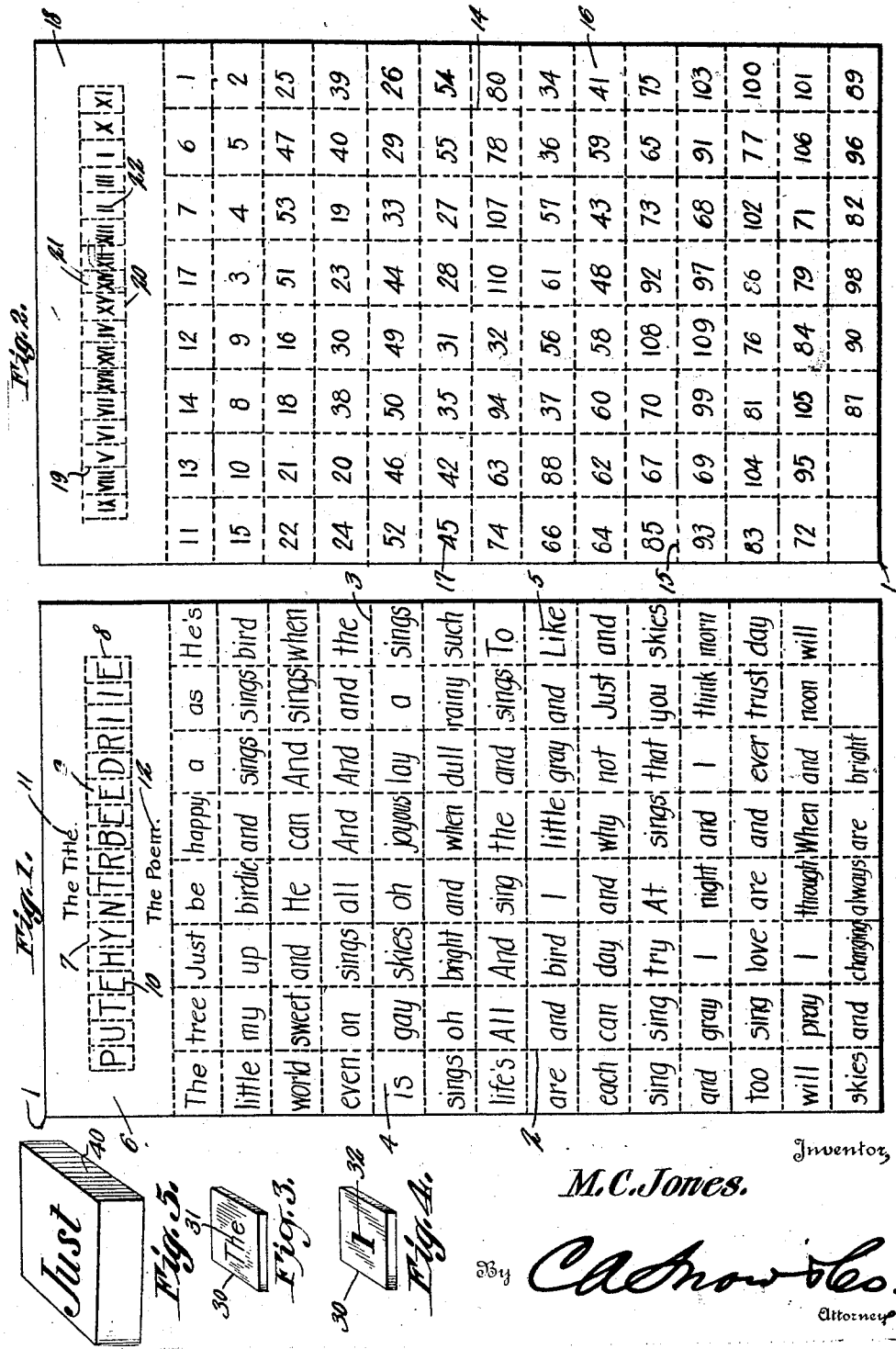
Inventor
M. C. Jones.
By C. A. Snow & Co.
Attorney Patented Feb. 9, 1926.

1,572,433

UNITED STATES PATENT OFFICE.

MARIE CATHERINE JONES, OF LOS ANGELES, CALIFORNIA.

POETIC PUZZLE AND POETIC-PUZZLE BLOCKS.

Application filed November 9, 1922, Serial No. 599,862. Renewed December 19, 1925.

*To all whom it may concern:*

Be it known that I, MARIE CATHERINE JONES, a citizen of the United States, residing at Los Angeles, in the county of Los Angeles and State of California, have invented a new and useful Poetic Puzzle and Poetic-Puzzle Blocks, of which the following is a specification.

The device forming the subject matter of this application is a game of that general type in which words and letters are combined to make reading matter, and the invention aims to supply a game which will provide entertainment and instruction, the game being simple and inexpensive to manufacture.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in front elevation, a sheet embodying the game forming the subject matter of this application; Figure 2 is a rear elevation of the sheet; Figures 3 and 4 are perspective views showing a slight modification.

Figure 5 is a perspective view showing a slight modification in the invention.

In carrying out the invention as disclosed in Figures 1 and 2, there is provided a sheet 1, made of paper or any suitable material. On its front surface, the sheet 1 is provided with longitudinal lines 2 and transverse lines 3 defining rectangles 4 wherein words 5 are inscribed. At the top of the sheet 1 there is a blank space 6 provided with transverse lines 7 and longitudinal lines 8 defining rectangles 9 wherein letters 10 are inscribed. At the top of the sheet 1 there is a legend 11 indicating that the letters 10 in the rectangles 9, when arranged properly, will form the title of a poem. In the blank space 6, below the letters 10 there is a legend 12, indicating that the words therebelow are adapted to constitute a poem, when arranged in proper order.

The rear surface of the sheet 1 is supplied with longitudinal lines 14 and transverse lines 15 defining rectangles 16 wherein Arabic numerals 17 are disposed. At the top of the sheet 1 on the rear surface thereof, there is a blank space 18 provided with longitudinal lines 19 and transverse lines 20 forming rectangles 21 wherein numerals 22 are disposed, roman numerals preferably being used at this point.

The transverse lines 3 and 15 register, the longitudinal lines 2 and 14 register, the transverse lines 7 and 20 register, and the longitudinal lines 8 and 19 register. These lines may be mere marks on the sheet, facilitating the cutting up of the sheet, by means of a pair of shears, into rectangles. If desired, the aforesaid lines may be in the form of perforations, permitting the sheet to be severed into rectangles, without the use of scissors or shears, the showing of the drawings being the same in either case.

By way of illustration, the game forming the subject matter of this application is based upon the following poem:—

*The birdie up my tree.*

The little birdie up my tree,
Just sings and sings.
He's happy as a bird can be,
And sings and sings
When all the world is bright and gay
And when the skies are dull and gray
And even on each rainy day,
Oh such a sweet and joyous lay
He sings and sings.
Oh little bird, why cannot I
Just sing and sing like you?
I think that I will try
To sing and sing
All through life's ever changing day
When skies are bright and skies are gray,
At morn and noon and night alway
I too will love and trust and sing and pray.

The letters 10 may be used to form the title of the poem, and the words 5 may be used to make the text of the poem.

The game may be played in various ways. If desired, the players may be assembled around a table, each player being provided with one of the sheets 1. If the scissors are available, each player may cut apart his own poem to form the rectangles, or if the sheet is perforated, the sheet may be severed into sections without using scissors. If desired, the sheets may be cut up into rectangles and the rectangles placed in a box, there being one box for each player. The players begin to arrange the letters 10, forming the title of the poem, by noting the numerals 22 and arranging the letters in accordance with the numerals. Then, noting the numerals 17, the words 5 may be arranged to form the text of the poem.

If desired, the sheets 1 may be cut up or severed otherwise into rectangles, the rectangular pieces being shuffled and distributed among the players. Under this plan, one sheet 1 is used for all of the players. The person who has the rectangle which is numbered 1 starts the play. The person next at the right lays down the rectangle which is numbered 2, if he has it, and if he does not have it, he is entitled to one draw from another player. If he fails to draw the rectangle which is numbered 2, the play passes on. In this way, the game continues until the complete poem is laid down on the board and the person who lays down the last word of the poem, thereby completing the poem, wins the game.

The foregoing are given merely as examples, and many other ways of utilizing the device may suggest themselves to those interested.

It is to be observed that the numerals 22 which designate the letters of the title of the poem are roman numerals whereas the numerals 17 which designate the words constituting the text of the poem are Arabic numerals. Consequently, the players have a key or hint at the start, enabling them to begin and complete the title of the poem without confusing those pieces which constitute the title with those pieces which constitute the text.

Although it has been stated hereinbefore that the device may be made of a sheet 1 adapted to be cut up, rectangles 30 of cardboard of any other suitable material may be used, as shown in Figures 3 and 4, each rectangle 30 being provided on one side with a word 31, and being provided upon its opposite side with the appropriate numeral 32, the same arrangement being carried out in connection with the rectangles which constitute the title of the poem, the letters 10 and the numerals 22 being used as hereinbefore explained.

The game forming the subject matter of this application will afford entertainment, and instruction in scansion and grammatical construction.

As disclosed in Figure 5, any desired number of blocks, constructed like the block 40, may be used in the making of the device.

What is claimed is:—

1. A game comprising a plurality of pieces, some of which are inscribed on one side with words adapted to form an intelligible text, when the pieces are arranged in proper order, others of the pieces being inscribed upon one side with letters adapted to form the title of the text when the pieces are arranged in proper order, all of the aforesaid pieces being inscribed on the opposite side with numerals denoting the order in which the words are to be arranged to form the text, and denoting the order in which the letters are to be arranged to form the title.

2. A device of the class described, constructed as set forth in claim 1, and further characterized by the fact that one set of the aforesaid numerals are Arabic numerals, whereas the other set of the aforesaid numerals are roman numerals, thereby to afford a distinguishing cue between title and text when the player begins to arrange the pieces.

3. A game embodying a sheet provided upon both sides with lines defining coinciding spaces, the spaces on one side of the sheet being inscribed with words adapted to form an intelligible text when placed in proper order, the spaces on the other side of the sheet being inscribed with numerals, denoting the order in which the words are to be arranged to form the text, the sheet being severable along the said lines, the sheet being provided on both sides with other lines defining coinciding spaces, the spaces on one side of the sheet being inscribed with letters adapted to form the title for the text when arranged in proper order, the spaces on the other side of the sheet being inscribed with numerals indicating the order in which the letters are to be arranged to form the title.

In testimony that I claim the foregoing as my own, I have hereto affixed my signature.

MARIE CATHERINE JONES.